US012436036B2

(12) United States Patent
Mbaye et al.

(10) Patent No.: US 12,436,036 B2
(45) Date of Patent: Oct. 7, 2025

(54) METHOD FOR MANUFACTURING A TEMPERATURE MEASURING DEVICE INTENDED TO BE CONNECTED TO A FLUID CONNECTOR, AND ASSOCIATED INTERMEDIATE ASSEMBLY

(71) Applicant: A. RAYMOND ET CIE, Grenoble (FR)

(72) Inventors: Mansour Mbaye, Moirans (FR); Thierry Guerin, Genilac (FR); Emile Ferrand, Echirolles (FR); Jan Kupfer, Lorrach (DE); Julien Rat, Rivier Apprieu (FR)

(73) Assignee: A. RAYMOND ET CIE, Grenoble (FR)

( * ) Notice: Subject to any disclaimer, the term of this patent is extended or adjusted under 35 U.S.C. 154(b) by 392 days.

(21) Appl. No.: 17/907,361

(22) PCT Filed: Jan. 28, 2021

(86) PCT No.: PCT/FR2021/050153
§ 371 (c)(1),
(2) Date: Sep. 26, 2022

(87) PCT Pub. No.: WO2021/191514
PCT Pub. Date: Sep. 30, 2021

(65) Prior Publication Data
US 2023/0111307 A1   Apr. 13, 2023

(30) Foreign Application Priority Data

Mar. 24, 2020   (FR) ........................................ 2002854

(51) Int. Cl.
*G01K 1/08*   (2021.01)
*G01K 1/14*   (2021.01)
(Continued)

(52) U.S. Cl.
CPC ................ *G01K 1/08* (2013.01); *G01K 1/14* (2013.01); *G01K 7/22* (2013.01); *G01K 13/02* (2013.01); *G01K 2205/00* (2013.01)

(58) Field of Classification Search
CPC .. G01K 1/08; G01K 1/14; G01K 7/22; G01K 13/02; G01K 2205/00
See application file for complete search history.

(56) References Cited

U.S. PATENT DOCUMENTS 5,743,648 A  *  4/1998  Zeindler ................. G01K 13/20
                                                        374/E13.002
2002/0124654 A1*  9/2002  Jacob ..................... G01L 9/0075
                                                        73/708

(Continued)

FOREIGN PATENT DOCUMENTS

CN       205877527        1/2017
CN       209084259        7/2019
(Continued)

OTHER PUBLICATIONS

International Search Report for International Application No. PCT/FR2021/050153 dated May 6, 2021, 2 pages.
(Continued)

*Primary Examiner* — Laura Martin
*Assistant Examiner* — Julia Fitzpatrick
(74) *Attorney, Agent, or Firm* — TraskBritt

(57) ABSTRACT

An intermediate assembly for a temperature measuring device comprises: a temperature sensor including a measuring cell and two metal branches, two electrical connection pins each having an attachment portion and a connection portion, both of the metal branches respectively being electrically linked to both of the electrical connection pins, at their attachment portion; the attachment portions of the two pins extending in a main plane and an end of the measuring cell occupying a predetermined position with respect to a (Continued)

reference point of the electrical connection pins, a plastic casing formed by at least two inserts positioned against the electrical connection pins, on either side of the main plane, the casing defining a clamp to hold the measuring cell along at least one transverse axis normal to the main plane.

18 Claims, 4 Drawing Sheets

(51) Int. Cl.
*G01K 7/22* (2006.01)
*G01K 13/02* (2021.01)

(56) References Cited

U.S. PATENT DOCUMENTS

| | | | | |
|---|---|---|---|---|
| 2004/0081225 | A1* | 4/2004 | Janicek | G01K 1/16 374/185 |
| 2016/0265979 | A1* | 9/2016 | Ihle | G01K 7/22 |
| 2016/0305825 | A1 | 10/2016 | Chokri | |
| 2017/0138798 | A1* | 5/2017 | Brown | G01K 1/14 |
| 2018/0238744 | A1* | 8/2018 | Harle | G01K 7/12 |
| 2019/0064000 | A1 | 2/2019 | Yoshihara et al. | |

FOREIGN PATENT DOCUMENTS

| | | | | |
|---|---|---|---|---|
| CN | 104048773 | B * | 12/2019 | G01K 1/14 |
| DE | 3902858 | A1 * | 2/1989 | |
| EP | 2339306 | | 8/2014 | |
| EP | 2821765 | A1 * | 1/2015 | G01K 1/00 |
| ES | 2291014 | T3 * | 2/2008 | B29C 45/14639 |
| FR | 2699673 | B1 | 3/1995 | |
| KR | 101891100 | B1 * | 2/2012 | |
| NO | 821320 | L * | 4/1982 | |
| WO | WO-0040939 | A1 * | 7/2000 | G01K 15/00 |

OTHER PUBLICATIONS

International Written Opinion for International Application No. PCT/FR2021/050153 dated May 6, 2021, 5 pages.
European Notification According to Articl 94(3) EPC for Application No. 21706021.9 dated Jan. 23, 2024, 17 pages with machine translation.

* cited by examiner

METHOD FOR MANUFACTURING A TEMPERATURE MEASURING DEVICE INTENDED TO BE CONNECTED TO A FLUID CONNECTOR, AND ASSOCIATED INTERMEDIATE ASSEMBLY

CROSS-REFERENCE TO RELATED APPLICATIONS

This application is a national phase entry under 35 U.S.C. § 371 of International Patent Application PCT/FR2021/050153, filed Jan. 28, 2021, designating the United States of America and published as International Patent Publication WO 2021/191514 A1 on Sep. 30, 2021, which claims the benefit under Article 8 of the Patent Cooperation Treaty to French Patent Application Serial No. FR2002854, filed Mar. 24, 2020.

TECHNICAL FIELD

The present disclosure relates to the field of fittings and connectors to allow fluid communication between pipes or ducts, in particular, for motor vehicles. It relates, in particular, to a method of manufacturing a temperature measuring device, which is suitable for attaching to a fluid connection fitting. It also relates to an intermediate assembly for the manufacture of the device.

BACKGROUND

In the field of fluid connectors for automobiles, it is generally beneficial to have quick connection fittings allowing easy integration of a sensor, the sensor having good properties of robustness, sensitivity and measurement reactivity and having a minimal impact on the flow of fluid intended to pass through the fitting.

Document CN205877527 discloses a quick connector comprising a sensor held in a connectable support; the sensor is positioned transversely with respect to the flow of the fluid and the sensitive head of the sensor is in direct contact with the fluid.

The main drawbacks of this type of connector are the risks of corrosion of the sensitive head of the sensor and of its metal electrical connection lugs, the risks of short-circuiting, in particular, when the fluid is an electrical conductor, and finally the risks of leaks between the connectable support and the sensor.

Other quick connector solutions propose covering or overmolding the sensitive head with a polymer or a resin, which eliminates the aforementioned risks of corrosion and short-circuiting. The overmolding of the sensor/connection pins assembly in the form of a connectable end piece also greatly limits the risks of fluid leaks. Such solutions are, in particular, described in documents EP2339306, US2016/305825 and CN209084259U.

To obtain precise and rapid detection of the temperature of the fluid, it is advantageous for the polymer or resin material placed on the sensitive head to exhibit good thermal conduction properties and/or for its thickness to be small and very well controlled.

Document FR2699673 proposes a solution based on an insert for holding the temperature sensor. The sensor comprises a sensitive pad, a first end of which is free and the second end of which is connected to electrical connection branches. The insert defines a cradle structure in which the second end of the sensitive pad is wedged. This cradle structure makes it possible to gain in precision on the thickness of thermoplastic material overmolded on the pad, by mechanically holding the latter during the overmolding operation. However, taking into account the tolerances on the dimensions of the sensitive pad, which can go up to a few tenths of a millimeter, the wedging of the second end of the pad in the cradle does not make it possible to guarantee a low and well-controlled thickness of the overmolding on the first end of the pad.

BRIEF SUMMARY

The present disclosure provides an alternative solution to those of the prior art, which seeks to remedy all or part of the aforementioned drawbacks. The present disclosure relates, in particular, to a method of manufacturing an integrated, robust, sensitive and reactive temperature measuring device, which is suitable for attaching to a fluid connection fitting. The present disclosure also relates to an intermediate assembly intended to be overmolded in a thermoplastic material in order to form the temperature measuring device.

The present disclosure relates to a method of manufacturing a temperature measuring device, the method comprising the following steps:
a) supplying a temperature sensor including a measuring cell and two metal branches, the measuring cell having a free first end and a second end secured to the metal branches,
b) providing two electrical connection pins, each having an attachment portion and a connection portion,
c) forming an electrical connection between one of the metal branches and one of the electrical connection pins and between the other of the metal branches and the other of the electrical connection pins, at their attachment portion, the attachment portions of the two pins extending in a main plane; the electrical connection being formed when the first end of the measuring cell occupies a predetermined position relative to a reference point of the electrical connection pins, then,
d) assembling a plastic casing formed by at least two inserts positioned against the electrical connection pins, on either side of the main plane, in order to form an intermediate assembly for the temperature measuring device, the casing defining a clamp to hold the measuring cell along at least one transverse axis normal to the main plane.

According to other advantageous and non-limiting features of the present disclosure, taken alone or in any technically feasible combination:
the electrical connection is formed when the first end of the measuring cell occupies a predetermined position along a longitudinal axis included in the main plane with respect to the reference point;
the clamp of the casing is formed by two flexible arms, bearing on two zones of the periphery of the measuring cell;
the two zones on which the flexible arms bear are symmetrical with respect to a longitudinal axis of symmetry of the cell;
the two inserts are secured to one another by a hinge;
each electrical connection pin forms an elbow, its attachment portion establishing an angle with its connection portion;
the reference point of the electrical connection pins is formed by the elbow;
the manufacturing method comprises a step e) comprising overmolding the intermediate assembly positioned in a mold, by injecting a thermoplastic material, in order to form the temperature measuring device;

step e) comprises, prior to the injection of the thermoplastic material, wedging the intermediate assembly in the mold, by means of at least two retaining elements cooperating with at least two recessed zones provided in the casing;

each electrical connection pin forms an elbow with an angle inclusively between 91° and 95° outside the mold, and wherein at least one retaining element bears on the casing so as to bend the intermediate assembly and form an elbow with an angle of 90° in the mold;

the intermediate assembly has a shape defined so as to overmold a homogeneous thickness of thermoplastic material on the assembly during step e).

The present disclosure relates to an intermediate assembly for a temperature measuring device comprising:

a temperature sensor including a measuring cell and two metal branches, the measuring cell having a free first end and a second end secured to the metal branches, two electrical connection pins, each having an attachment portion and a connection portion, both of the metal branches respectively being electrically linked to both of the electrical connection pins, at their attachment portion; the attachment portions of the two pins extending in a main plane and the first end of the measuring cell occupying a predetermined position with respect to a reference point of the electrical connection pins, a plastic casing formed by at least two inserts positioned against the electrical connection pins, on either side of the main plane, the casing defining a clamp to hold the measuring cell along at least one transverse axis normal to the main plane.

According to other advantageous and non-limiting features of the present disclosure, taken alone or in any technically feasible combination:

the first end of the measuring cell occupies a predetermined position along a longitudinal axis included in the main plane with respect to the reference point;

the casing has a generally symmetrical shape with respect to a longitudinal axis included in the main plane, at least in a zone extending from the measuring cell to the attachment portions;

the clamp of the casing is formed by two flexible arms, bearing on two zones of the periphery of the measuring cell;

the two zones on which the flexible arms bear are symmetrical with respect to a longitudinal axis of symmetry of the cell;

each flexible arm is able to accommodate a deformation of less than or equal to 0.7 mm, along the transverse axis;

each electrical connection pin forms an elbow, its attachment portion establishing an angle with its connection portion and the connection portions defining a secondary plane;

the intermediate assembly comprises at least two recessed zones arranged in the casing, in order to cooperate with at least two retaining elements during the overmolding of the intermediate assembly;

each insert of the casing comprises at least one fastening system to allow the assembly of the casing;

the two inserts are secured to one another by a hinge;

the fastening system comprises a centering pin on one of the inserts cooperating with a slot on the other insert, and a male element of a clip on one of the inserts cooperating with a female element of the clip on the other insert;

the clip is placed as close as possible to the clamp of the casing;

the casing comprises an upper insert, positioned on an outer face of the attachment portions of the electrical connection pins, and a lower insert, positioned on an inner face of the portions.

The present disclosure finally relates to a temperature measuring device obtained by overmolding an intermediate assembly as above.

The temperature measuring device comprises a measuring head around the measuring cell, which has a thickness of thermoplastic material less than or equal to 0.5 mm, or even less than or equal to 0.3 mm.

BRIEF DESCRIPTION OF THE DRAWINGS

Further features and advantages of the present disclosure will become apparent from the following detailed description of the present disclosure, with reference to the accompanying figures, in which.

DETAILED DESCRIPTION

Figure 1A:
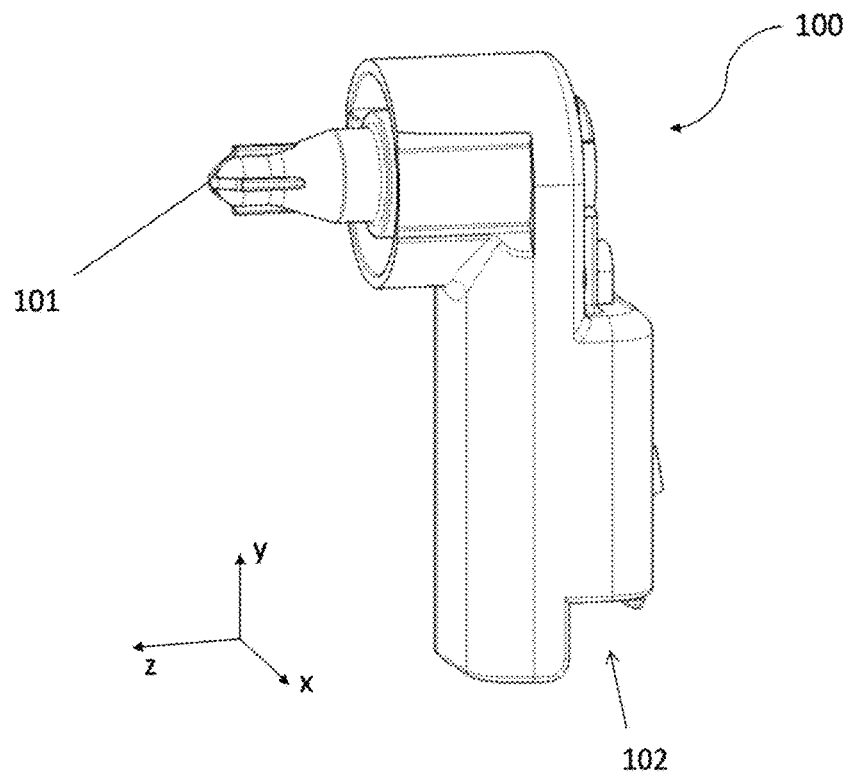
FIGS. 1A and 1B show a temperature measuring device alone and mounted on a fluid connection fitting, respectively.

The present disclosure relates to a method of manufacturing a temperature measuring device 100, an example of which is illustrated in FIG. 1A.

Such a temperature measuring device 100 is, in particular, suitable for being connected to a fluid connection fitting 150 allowing two ducts to be placed in communication, these ducts and the fluid connection fitting 150 being intended to be passed through by a fluid such as fuel or coolant, for example, in a motor vehicle engine.

Figure 1B:
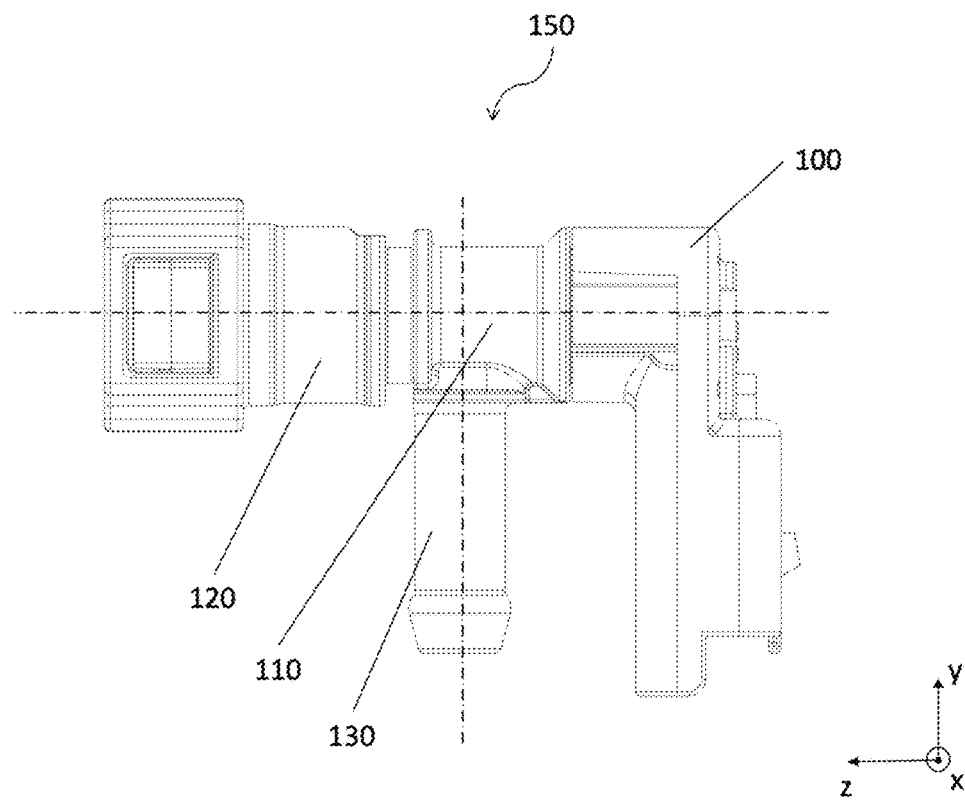

As can be seen in the example of FIG. 1B, the fluid connection fitting 150 may comprise a first end piece 120 intended to be connected to the first fluid duct and a second end piece 130 intended to be connected to the second fluid duct. Of course, the shape and the connection configuration of the fluid connection fitting 150 are not fixed and could be different from those illustrated in FIG. 1B.

The first end piece 120 in the illustrated embodiment has a tubular shape and is provided with a female quick connector. The term "quick connector" is understood to mean a connector that does not require special tools to make the connection between two elements: a quick connector is therefore usually based on a clipping or snap-in mechanism. The second end piece 130 also has a tubular shape and is, for example, provided with a male connector.

The fluid connection fitting 150 further comprises a coupling member 110 placing the first 120 and the second 130 end pieces in communication. The coupling member 110 defines an internal tubular space in which the fluid will be made to circulate, from the internal tubular space of the first end piece 120 to the internal tubular space of the second end piece 130. The coupling member 110 includes an orifice at which the temperature measuring device 100 is hermetically fixed, for example, by clipping or snap-fastening, or by laser welding.

The temperature measuring device 100 has a measuring head 101 (FIG. 1A), which opens into the internal tubular space of the coupling member 110 and which, in contact with the fluid, can measure the temperature of the fluid. At its other end 102, the temperature measuring device 100 allows access to electrical connection pins, in order to connect the device to an external controller.

Note that the temperature measuring device 100 could have a shape other than that at a right angle illustrated in FIG. 1A, depending on the mounting and/or size constraints.

The present disclosure therefore relates to a method of manufacturing such a temperature measuring device 100.

Figure 2A:
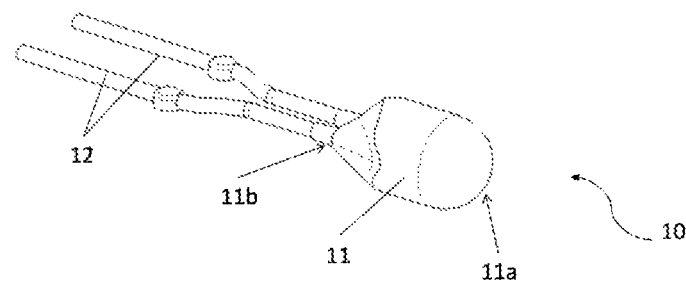
FIGS. 2A to 2E show steps in a method of manufacturing the temperature measuring device according to the present disclosure.

The method comprises a first step a) of providing a temperature sensor 10 including a measuring cell 11 and two metal branches 12 as illustrated in FIG. 2A. The temperature sensor 10 can, in particular, consist of an NTC thermistor ("negative temperature coefficient"), the resistance of which decreases uniformly when the temperature increases and vice versa.

The measuring cell 11 has a free first end 11a and a second end 11b secured to the metal branches 12. In the temperature measuring device 100, which will be obtained at the end of the manufacturing method according to the present disclosure, the measuring cell 11 (or sensitive cell, capable of measuring the temperature) is placed in the measuring head 101.

Figure 2B:
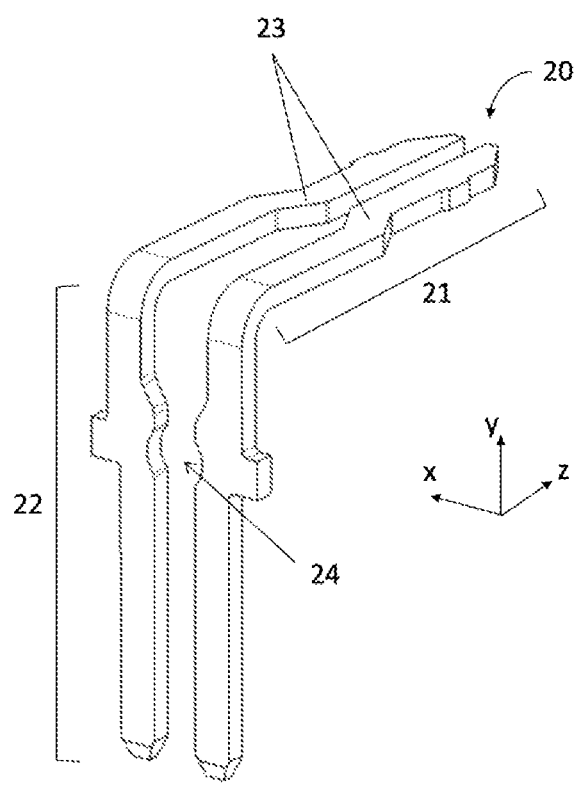

The manufacturing method next comprises a step b) for providing two electrical connection pins 20, each having an attachment portion 21 and a connection portion 22 (FIG. 2B).

At the end of the manufacturing method of the device 100, the connection portions 22 are intended to extend toward the second end 102 of the temperature measuring device 100, for connection to the external controller.

The attachment portions 21 define a main plane (x, z) and extend along a longitudinal axis z. Advantageously, they each have an electrical connection zone 23, defined so as to facilitate the next step of connecting the metal branches 12 of the temperature sensor 10 to the attachment portions 21.

Each electrical connection pin 20 may be planar or form an elbow as illustrated by way of example in FIG. 2B. In the latter case, the attachment portion 21 establishes an angle with the connection portion 22. According to a particular embodiment, the elbow has an angle close to 90°.

The connection portions 22 of the two electrical connection pins 20 define a secondary plane, which forms an angle greater than or equal to 0 with the main plane (x, z). In the example of FIG. 2B, the secondary plane corresponds to the plane (x, y) and therefore forms an angle of 90° with the main plane (x, z).

Figure 2C:
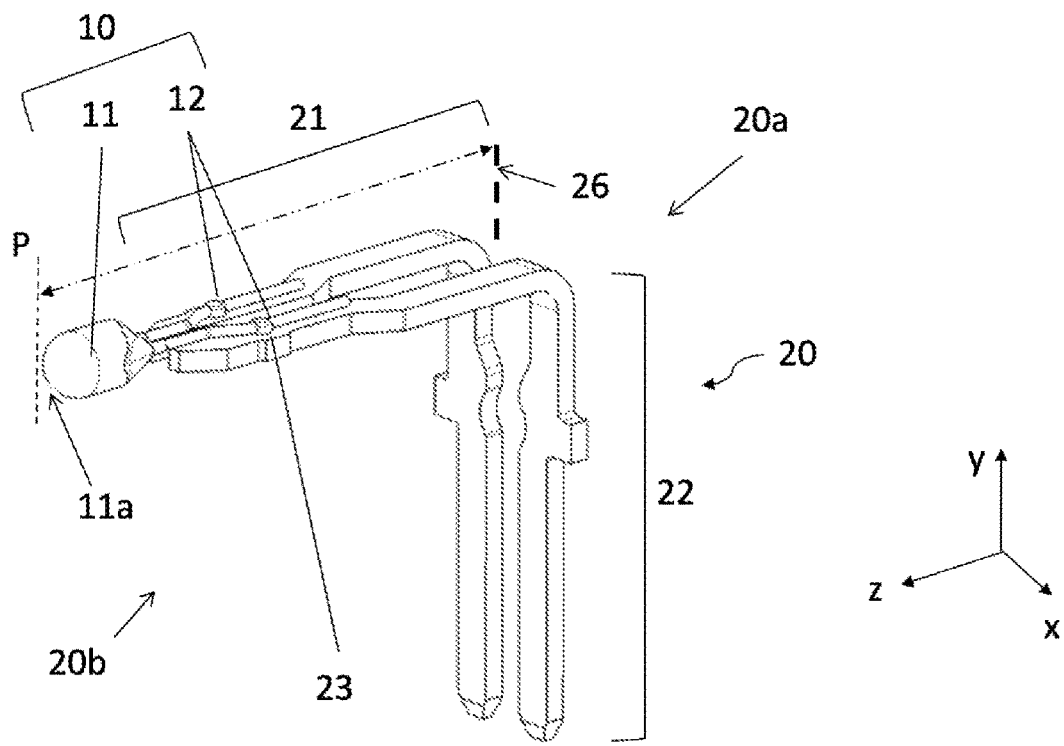

The manufacturing method comprises a third step c) comprising forming an electrical connection of each metal branch 12 respectively on each electrical connection pin 20, at the attachment portion 21 (FIG. 2C).

The formation of the electrical connection may, for example, consist of a weld carried out between the metal branches 12 and the electrical connection pins 20. The welding of the metal branches 12 is carried out on the electrical connection zones 23 of the attachment portions 21. Because there is no part other than the metal parts to be welded at this stage, the quality of the weld is very good and is not polluted by the potential degradation of plastic parts joined together, as can be the case in the solutions of the state of the art.

Alternatively, the electrical connection can be established by keeping the branches 12 and pins 20 in contact by applying a bearing force. Such a bearing force could, for example, be maintained in the next step d) of the method.

In all cases, the electrical connection is formed when the first end 11a of the measuring cell 11 occupies a predetermined position P, relative to a reference point 26 of the electrical connection pins 20.

In the example of FIG. 2C, the reference point 26 is materialized by the elbow formed between the attachment portion 21 and connection portions 22. This reference point 26 could alternatively be formed by a mark, a shoulder and/or a notch, arranged on the pins 20. Still in the example of FIG. 2C, the first end 11a occupies a predetermined position P along the longitudinal axis z, relative to the reference point 26. Alternatively, the predetermined position could be defined according to one or more other directions (3D).

Thus, step c) of the method advantageously comprises, prior to establishing the electrical connection, a step of precise positioning of the temperature sensor 10 with respect to the reference point 26 of the pins 20. In particular, the positioning is controlled to +/−0.1 mm, or even to +/−0.05 mm. As discussed in further detail below, this precise and controlled positioning of the first end 11a of the measuring cell 11 with respect to the pins 20 allows a low and controlled thickness of material to be obtained on the cell 11, forming the measuring head 101 of the temperature measuring device 100.

By convention, the outer face 20a of the pins 20 will be called the face with which the branches 12 of the sensor 10 are in contact, as can be seen in FIG. 2C; this outer face 20a applies to the attachment portion 21 and to the connection portion 22 of the pins 20. The opposite face of the pins 20, which also applies to the attachment portion 21 and to the connection portion 22, is referred to herein as the inner face 20b.

Figure 2D:
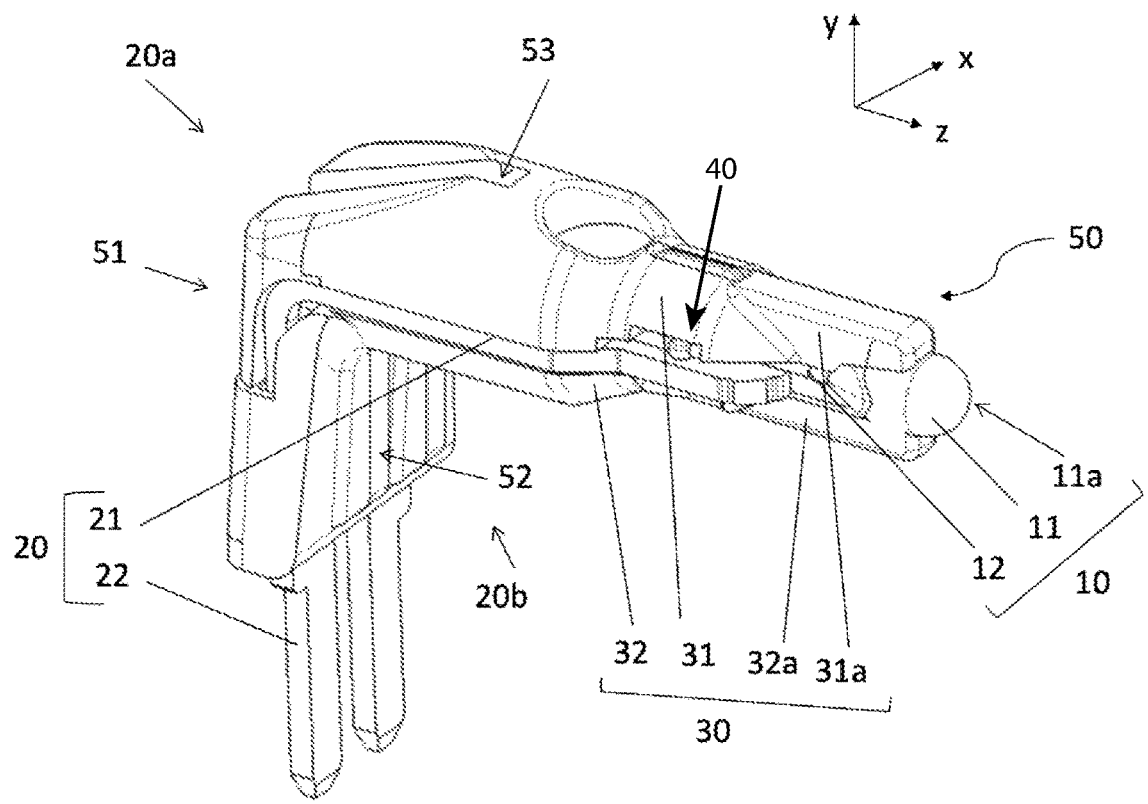

The manufacturing method then comprises a step d) of assembling a plastic casing 30 on the electrical connection pins 20, in order to form an intermediate assembly 50 for the temperature measuring device 100 (FIG. 2D). This assembly leads to the securing of the casing 30 on the pins 20 (already in contact with the metal branches 12 of the sensor 10).

In the particular case where the metal branches 12 are only kept in contact (and not welded, for example) with the pins 20, the assembly of the casing 30 provides the means for fixing and holding the metal branches 12 against the pins 20, by bearing. In other words, the casing 30 sandwiches branches 12 and pins 20 so as to keep them firmly in contact with one another.

The casing 30 is formed by at least two inserts, a so-called upper insert 31 and a so-called lower insert 32, positioned against the pins 20, on either side of the main plane (x, z). The upper insert 31 is positioned at least on the outer face 20a of the attachment portion 21 of each pin 20, and the lower insert 32 is positioned at least on the inner face 20b of the attachment portion 21 of each pin 20.

According to a first variant, the two inserts 31, 32 are supplied separately prior to the assembly of the casing 30 on the pins 20. According to a second variant, the two inserts 31, 32 are secured to one another by a hinge, for example, formed by a plastic tongue. The two inserts 31, 32, although linked, can thus easily be positioned on either side of the pins 20 owing to the articulation of the hinge.

The casing 30 defines a clamp 31a, 32a for holding the measuring cell 11, at least along a transverse axis y normal to the main plane (x, z). In other words, the clamp prevents (or greatly limits) translation of the measuring cell 11 along the transverse axis y. The clamp 31a, 32a can optionally have a more covering shape than that illustrated in FIG. 2D: in this case, the measuring cell 11 can be stabilized along other axes contained in the plane (x, y) normal to the longitudinal axis z.

Figure 3:
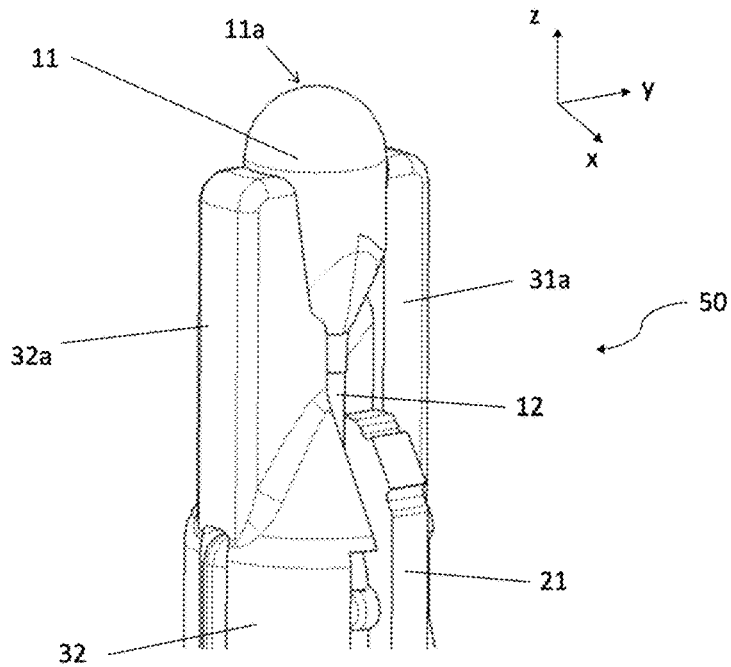
FIG. 3 shows a partial view of an intermediate assembly for a temperature measuring device, in accordance with the present disclosure.

Advantageously, the clamp is formed by two flexible arms 31a, 32a, bearing on two zones of the periphery of the measuring cell 11. These two zones could be symmetrical with respect to a longitudinal axis of symmetry z of the cell 11, as can be seen in FIGS. 2D and 3. Each flexible arm 31a, 32a is preferably able to accommodate a deformation of up to 0.7 mm, along the transverse axis y. In other words, with respect to a rest position in which the two arms 31a, 32a would be face to face, not deformed, each of them can be deformed to increase the distance separating them along the transverse axis y by a value less than or equal to 0.7 mm.

This flexibility makes it possible to accommodate disparities in shapes or diameters of the measuring cells 11. The measuring cells are in fact frequently specified with a maximum diameter, for example, 2.5 mm, but their diameter varies in practice between 1.8 mm and 2.5 mm. The flexible arms 31a, 32a of the clamp thus make it possible to keep the measuring cell 11 stable at least along the transverse axis y, or even to recenter it in the main plane (x, z), by accommodating the problems of tolerances on its diameter, and without applying excessive stress to it, which could damage the sensor 10.

The assembly of the two inserts 31, 32 can be done in various ways.

According to one embodiment, the two inserts can be glued or welded to one another to form the casing 30 of the intermediate assembly 50.

According to another embodiment, each insert 31, 32 comprises at least one fastening system 40 to allow assembly of the casing 30. The fastening system can, in particular, be based on a clip. For example, the fastening system 40 could comprise a centering pin on one of the inserts cooperating with a slot on the other insert. It may also comprise a male element of a clip on one of the inserts cooperating with a female element of the clip on the other insert.

Advantageously, the clip is placed as close as possible to the clamp 31a, 32a of the casing 30, so that the assembled casing 30 is as rigid as possible near the measuring cell 11 and only the flexibility of the arms 31a, 32a accommodates the size tolerances of the cell 11.

The lower insert 32 may comprise an elbow portion 32b suitable for the case where the pins 20 have an elbow. Openings are then provided in the lower insert 32 to engage the connection portions 22 of the pins 20. Advantageously, the connection portions 22 comprise wedges 24, which are suitable for positioning and holding the lower insert 32. These wedges 24 can be carried by the connection portions 22 or by the insert 32.

In the intermediate assembly 50, the casing 30 preferably has a generally symmetrical shape with respect to the longitudinal axis z, at least in a zone extending from the measuring cell 11 to the attachment portions 21 (FIG. 2D). Because it is symmetrical, this general shape has the advantage of facilitating the subsequent step of overmolding the intermediate assembly 50 and making it easier and more reliable, in order to form the temperature measuring device 100.

Advantageously, the intermediate assembly 50 further has a shape defined so as to overmold a homogeneous and substantially constant thickness of thermoplastic material on the intermediate assembly 50 during the subsequent overmolding step. This defined shape is essentially conferred upon it by the shape of the casing 30. The formation of a uniform thickness of thermoplastic material simplifies the overmolding step and makes it more reliable, and improves the quality of the obtained device 100.

Figure 2E:
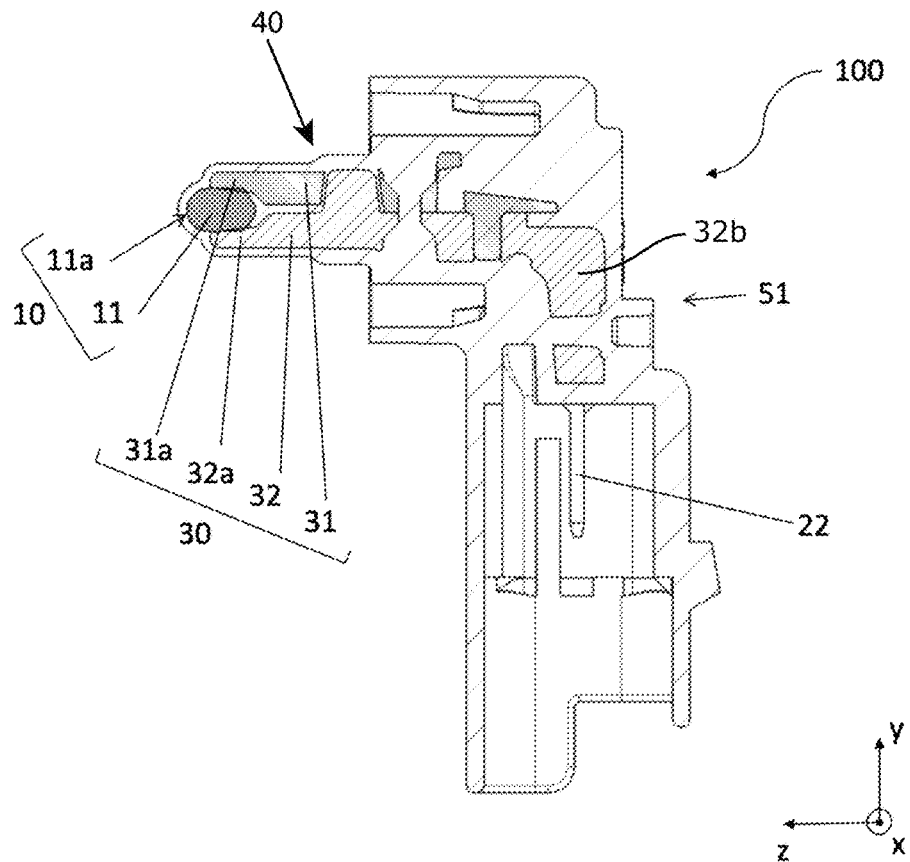

As mentioned above, the manufacturing method according to the present disclosure can then implement a step e) comprising overmolding the intermediate assembly 50, positioned in a mold, by injecting a thermoplastic material, in order to form the temperature measuring device 100 (FIG. 2E).

The intermediate assembly 50 is mechanically held in the mold, in particular, it is immobilized by at least two retaining elements cooperating with the casing 30. The fact that the measuring cell 11 is precisely positioned (predetermined position P) with respect to the pins 20 and, therefore, with respect to the casing 30 secured to the pins 20, induces a precise and controlled positioning of the measuring cell 11 in the mold. It is thus possible to overmold a very well controlled thickness of thermoplastic material on the measuring cell 11. Any thickness is accessible, but, in particular, it is possible to achieve thicknesses less than or equal to 0.5 mm, or even less than or equal to 0.3 mm with good uniformity over the free surface of the cell 11 (i.e., outside the zone of the periphery of the cell 11 on which the clamp 31a, 32a bears), and, in particular, at the first end 11a. The uniformity of thickness on the measuring cell 11 may be better than +/−0.1 mm.

Thin and very well controlled thicknesses of plastic material at the measuring head 101 of the temperature measuring device 100 give the temperature measuring device 100 very good properties, such as reactivity and measurement precision, in addition to the associated robustness when overmolding the sensor 10.

As mentioned above, step e) comprises, prior to the injection of the thermoplastic material, wedging the intermediate assembly 50 in the mold. Advantageously, the at least two retaining elements that allow this wedging cooperate with at least two recessed zones 51, 52, 53 arranged in the casing 30.

When the pins 20 have an elbow with an angle of 90° (to form a temperature measuring device 100 according to the configuration illustrated in FIG. 1), it is typical to measure a dispersion of the order of +/−2° around 90°, linked to the bending uncertainty of the pins 20. Such a dispersion of the angle of the elbow is therefore also observable on the intermediate assemblies 50. Now, when very low overmolding thicknesses are targeted on the measuring cell 11, an angle defect of this order of magnitude can significantly deteriorate the precision and uniformity of the overmolded thickness.

Thus, according to one particular embodiment, the electrical connection pins 20 provided in step b) form an elbow with an angle inclusively between 91° and 95°, that is to say a target of 93°+/−2°. During step e), at least one retaining element bears on the casing 30 so as to bend the intermediate assembly 50 and form an elbow with an angle of 90°.

Of course, the present disclosure is not limited to the embodiments and examples that have been described, and it is possible to add alternative embodiments thereto without departing from the scope of the present disclosure as defined by the claims.

The invention claimed is:

1. A method of manufacturing a temperature measuring device, the method comprising the following steps:

a) supplying a temperature sensor including a measuring cell and two metal branches, the measuring cell having a free first end and a second end secured to the metal branches;
b) providing two electrical connection pins each having an attachment portion and a connection portion;
c) forming an electrical connection between one of the metal branches and one of the electrical connection pins and between the other of the metal branches and the other of the electrical connection pins, at their attachment portions, respectively, the attachment portions of the two pins extending in a main plane, the electrical connections being formed when the first end of the measuring cell occupies a predetermined position relative to a reference point of the electrical connection pins, the first end occupying the predetermined position as a result of a positioning step controlled to better than +/−0.1 mm of the first end relative to the reference point; and
d) assembling a plastic casing formed by at least two inserts positioned against the electrical connection pins, on either side of the main plane, to form an intermediate assembly intended to be overmolded to form the temperature measuring device, the casing defining a clamp to hold the measuring cell along at least one transverse axis normal to the main plane, wherein the clamp of the casing is formed by two flexible arms, each belonging to an insert, and bearing on two areas of the periphery of the measuring cell.

2. The method of claim 1, wherein the two inserts are secured to one another by a hinge.

3. The method of claim 1, further comprising the following step:
e) overmolding the intermediate assembly positioned in a mold, by injecting a thermoplastic material to form the temperature measuring device.

4. The method of claim 3, wherein step e) comprises, prior to the injecting of the thermoplastic material, wedging the intermediate assembly in the mold using at least two retaining elements cooperating with at least two recessed zones provided in the casing.

5. The method of claim 4, wherein each electrical connection pin forms an elbow with an angle inclusively between 91° and 95° outside the mold, and wherein at least one retaining element bears on the casing so as to bend the intermediate assembly and form an elbow with an angle of 90° in the mold.

6. An intermediate assembly intended to be overmolded to form a temperature measuring device comprising:
a temperature sensor including a measuring cell and two metal branches, the measuring cell having a free first end and a second end secured to the metal branches;
two electrical connection pins each having an attachment portion and a connection portion, both of the metal branches respectively being electrically linked to both of the electrical connection pins, at their attachment portion, the attachment portions of the two pins extending in a main plane, the first end of the measuring cell occupying a predetermined position, within +/−0.1 mm or better, with respect to a reference point of the electrical connection pins, independently of the dimensional tolerances of the measuring cell; and
a plastic casing formed by at least two inserts positioned against the electrical connection pins, on either side of the main plane, the casing defining a clamp to hold the measuring cell along at least one transverse axis normal to the main plane, the clamp of the casing being formed by two flexible arms, each belonging to an insert, and bearing on two areas of the periphery of the measuring cell.

7. The intermediate assembly of claim 6, wherein each flexible arm is able to accommodate a deformation of less than or equal to 0.7 mm along the transverse axis.

8. The intermediate assembly of claim 6, further comprising at least two recessed zones arranged in the casing.

9. The intermediate assembly of claim 6, wherein each insert of the casing comprises at least one fastening system to allow the assembly of the casing.

10. The intermediate assembly of claim 6, wherein the two inserts are secured to one another by a hinge.

11. The intermediate assembly of claim 9, wherein the fastening system comprises a centering pin on one of the inserts cooperating with a slot on the other insert, and a male element of a clip on one of the inserts cooperating with a female element of the clip on the other insert.

12. The intermediate assembly of claim 6, wherein the two inserts of the casing are an upper insert and a lower insert, the upper insert being positioned on an outer face of the attachment portions of the electrical connection pins, and the lower insert positioned on an inner face of the attachment portions.

13. A temperature measuring device, comprising:
a temperature sensor including a measuring cell and two metal branches, the measuring cell having a free first end and a second end secured to the metal branches;
two electrical connection pins each having an attachment portion and a connection portion, both of the metal branches respectively being electrically linked to both of the electrical connection pins, at their attachment portion, the attachment portions of the two electrical connection pins extending in a main plane, the free first end of the measuring cell occupying a predetermined position, within +/−0.1 mm or better, with respect to a reference point of the electrical connection pins, independently of the dimensional tolerances of the measuring cell; and
a plastic casing formed by at least two inserts positioned against the electrical connection pins, on either side of the main plane, the casing defining a clamp to hold the measuring cell along at least one transverse axis normal to the main plane, the clamp of the casing being formed by two flexible arms, each belonging to an insert, and bearing on two areas of the periphery of the measuring cell; and
a polymer overmolding.

14. The temperature measuring device of claim 13, wherein the polymer overmolding includes a measuring head around the measuring cell has a thickness of polymer material less than or equal to 0.5 mm.

15. The temperature measuring device of claim 14, wherein the measuring head around the measuring cell has a thickness of polymer material less than or equal to 0.3 mm.

16. The temperature measuring device of claim 13, wherein the clamp of the casing is formed by two flexible arms, bearing on two zones of a periphery of the measuring cell.

17. The temperature measuring device of claim 13, wherein each flexible arm is able to accommodate a deformation of less than or equal to 0.7 mm along the transverse axis.

18. The temperature measuring device of claim 13, wherein the two inserts are secured to one another by a hinge.

* * * * *